Sept. 28, 1948.     N. C. COATES     2,450,371
MASONRY SAW
Filed March 24, 1945

INVENTOR.
Neligh Clair Coates
BY
Thos. E. Scofield
ATTORNEY.

Patented Sept. 28, 1948

2,450,371

UNITED STATES PATENT OFFICE 2,450,371

MASONRY SAW

Neligh Clair Coates, Kansas City, Mo.

Application March 24, 1945, Serial No. 584,544

14 Claims. (Cl. 125—13)

This invention relates to improvements in masonry saws and refers more particularly to a power saw employing a disk cutter mounted upon an adjustable head held rigid during the cutting operation.

The invention is an altered type of construction over that shown in Patent 2,171,024 dated August 29, 1939, and Patent 2,338,318 dated January 4, 1944, and differs from the former patent in that the instant device relates to a rigid head masonry saw as distinguished from a resiliently mounted head shown in the patent.

Until the advent of power driven masonry saws it was usual practice to cut and form ceramics in building construction, furnace building, tile fitting and wherever bricks or tiles were to be laid by hand. Masonry saws employ a circular cutter blade rotated at high speed and formed of abrasives such as silicon carbide or steel alloy rimmed with a diamond dust composition. The different types of saws are for different uses, silicon carbide disks principally for open texture brick and tile, while diamond blade saws are used for the harder, closer texture bricks and tile and for glazed products. Experience in cutting these different types of ceramics has shown it to be preferable to have abrasive cutters of the silicon carbide type resiliently mounted so shallow kerfs can be made during the cutting procedure permitting the operator to feed the cutter according to the ability of the cutter to sever the texture of the particular ceramic workpiece being cut. When the diamond blade is used the cutter head must be rigidly mounted, and the rapidity of feeding the blade to the work is then governed solely by the speed at which the work is fed to the cutter blade. When using the diamond blade cutter it is essential that a lubricant be fed to the cutter, no lubricant being used with blades of the silicon carbide type.

An object of the present invention is to provide a masonry saw in which the cutter head which supports the rotating cutter blade is adjustable and may be fixed in any adjusted position.

Another object is to provide a cutter head which is easily adjusted vertically on the frame of the machine and after adjustment may be fixed to position the cutter in any desired position with reference to the workpiece.

A further object is to provide a lubricating system for the circular cutting blade in which the lubricant is evenly and uniformly distributed to the cutting edge of the blade and excess lubricant recirculated to the blade for reuse and in this manner diverted from the workpiece or from the hands of the operator.

Other and further objects of the invention will appear from the following description.

Figure 1:
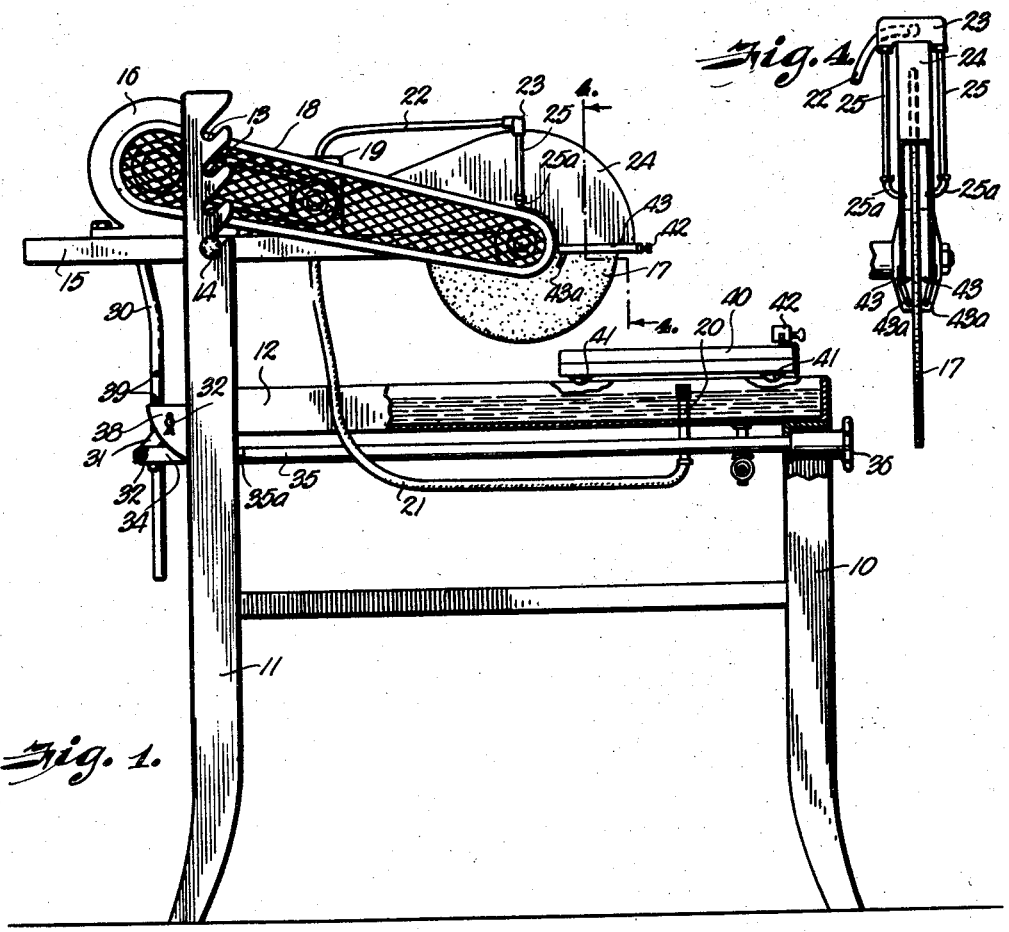
Figures 2, 3:
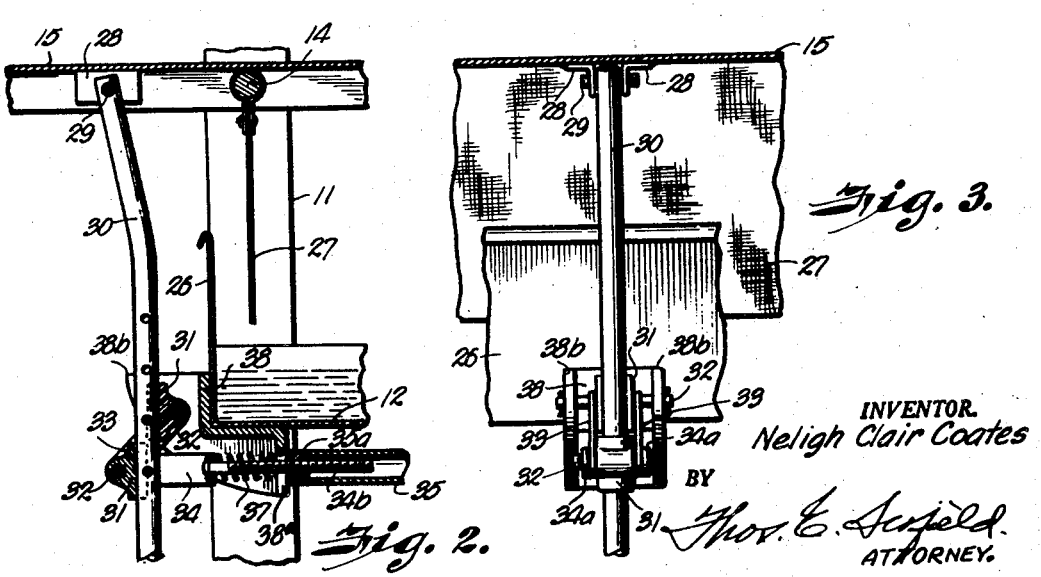

In the accompanying drawings which form a part of the instant specification and are to be read in conjunction therewith and in which like reference numerals are used to indicate like parts in the various views, Fig. 1 is a side elevational view of an apparatus embodying the invention with parts broken away, Fig. 2 is an enlarged side view of the head adjustment mechanism, Fig. 3 is a rear view of the mechanism shown in Fig. 2, and Fig. 4 is a view taken along the line 4—4 in Fig. 1 in the direction of the arrows.

The frame or standard of the saw comprises front uprights or legs 10, rear uprights 11, and a horizontal support 12 which has the form of a tray or reservoir. Pivoted in notches 13, formed in the rear uprights 11 on pins 14, is the cutter head 15. This cutter head is a platform arrangement upon one end of which is mounted a motor 16 and on the opposite end a cutter disk 17. The shaft of the cutter disk is carried in suitable bearings indistinctly shown behind a screen guard 18 positioned around the V-belt which drives the cutter through pulleys on the motor and cutter shafts. Electrical power is supplied to the motor through conduits not shown. Also mounted on the head 15 and driven from the motor by a separate belt is a lubricant circulating pump 19. This pump takes suction from the standpipe 20 in reservoir 12 drawing the liquid up through flexible pipe 21 and discharging it through pipe 22 into a manifold 23 mounted on top of the guard 24 of the disk cutter. Depending pipes 25 on opposite sides of the guard have elbow shaped jets 25a which extend through holes in the guard and jet the lubricant onto the sides of the cutter remote from the outer cutting edge. Since the cutter is rotating at high speed the lubricant jetted against the sides of the cutter is projected outwardly along the sides of the cutter in the form of thin films.

Heretofore, where lubricant was supplied to the outer edge of the cutter, which is usual practice, the centrifugal force of the rotating cutter immediately threw it off, thus eliminating it from the edge of the cutting blade and materially reducing its lubricating effect. Application of lubricant to the edge of the cutter aggravated the spraying effect produced by centrifugal force of the cutter inconveniencing the operator and introducing other inefficiencies in the operation of the machine. Between the rear uprights and forming the rear wall of the reservoir 12 is a splash plate 26. Attached to the bottom of the cutter head and depending therefrom in front of the splash plate is a flexible curtain 27 preferably of canvas or other moisture-resistant material. The curtain and splash plate drain lubricant thrown from the rotating cutter back into the reservoir where it is recirculated through the pump 19 to the cutter. In the top of the standpipe 20 is a screen to eliminate contamination from the lubricant circulating system.

Removably attached to the front edge of the guard by set screw 42 is a trough 43. The inwardly projecting upturned edges of the trough extend into the guard and form gutters between the guard and sides of the cutter. These gutters collect excess lubricant and drain it back to the center of the rotating cutter disk through spouts or baffles 43a. Thus, a constant, uniform film of lubricant is supplied to the edge of the cutter and excess lubricant is recirculated to the center of the disk to be recombined with the films added through jets 25a. Lubricant thrown from the periphery of the disk during the cutting operation is drained back into the reservoir from curtain 27 and splash board 26.

Beneath the platform which forms the support for the cutter head and rearwardly of the uprights 11 are angles 28 whose depending flanges are perforated by holes. The holes in the two angle members are in alignment to receive pin 29 insertable in the holes and through a hole in the upper end of vertical rod 30. The lower end of rod 30 is gripped on opposite sides by clamping dogs 31. These clamping dogs are held in place by pins 32 which pivot the dogs to the ends of link members 33 shown best in Figs. 2 and 3. The ends 34a of yoke 34 are also pivoted to the lower pin 32, the front end of the yoke terminating in a threaded bolt 34b. Bolt 34b is screwed into the blank end 35a of adjustment tube 35 positioned below the horizontal support 12 and extending from the rear to the forward end of the frame. The front end of the tube is carried by a transverse support member between uprights 10 and has affixed thereto a handle 36. Between yoke 34 and the threaded rear end of tube 35 surrounding bolt 34b is a coil spring 37 constantly urging the yoke and tube apart and tending to separate and release the clamping dogs. An angle member or saddle 38 fitted to the lower rear edge of reservoir 12 serves as a support for the head adjustment assembly. The lower transverse flange of the saddle is cut away, as shown at 38a, to permit passage therethrough of the adjustment tube 35 and bolt 34b of the yoke. The upper lateral wings 38b of the saddle serve as supports for the ends of a pin inserted into vertically spaced holes 39 in the vertical bar 30 when the clamping dogs are released and the cutter head is to be raised or lowered to different notches of the uprights.

Beneath the cutter and on the top edges of the sides of the tray or reservoir 12 is a workpiece conveyor or carriage 40. This carriage has flanged wheels 41 operating in roller bearings, the wheels roll upon the top rims of the tray and permit the carriage to be moved back and forth beneath the cutter.

The brick or tile to be sawed is placed upon the carriage and the location of the cut determined by an adjustable scale 42. Handle 36 is unscrewed to release the clamping dogs 31 from the vertical bar 30. If the cutter head is too low and need be raised a pin is put through one of the holes 39 immediately adjacent the top wings 38b of the saddle and the front end of the head manually raised until the pin supports the weight of the head. Working upon the pin as a fulcrum, the front of the cutter head is raised until the pivot pins 14 are lifted out of their notches and lowered into notches which will position the head at a proper height. The pin which served as a support is then removed, the head leveled or angled to a correct position with respect to the workpiece, and handle 36 turned until the clamping dogs 31 are tightened firmly against opposite sides of the rod 30. Gripping of the rod by the dogs forms a rigid connection between the head and the frame locating the head in any selected position. If the head is too high, lowering the head is accomplished in much the same manner. The adjustment assembly is released by turning handle 36 in the opposite direction, a pin is inserted in one of the holes 39 of rod 30 and using the pin as a fulcrum the pivot pins 14 of the head are lifted from the notches in the uprights and lowered to notches below. The pin is then removed and the head is again tightened to rigid adjustment in the lowered position.

It will be noted that the upper portion of bar 30 is bent rearwardly giving the bar a dog-leg appearance and that the upper end of the bar is affixed to the head or platform of the head a short distance forward of its rear end. These two features of construction play an important part in raising and lowering the head. The bend in the bar 30 tends to shift the weight of the head rearwardly when it is manually raised or lowered in adjustment of the height of the head in the notches of the uprights. In other words, when the head is manually raised or lowered and the pintles or pivot pins shifted from one set of notches to another the weight of the head is automatically shifted toward the rear causing the pivot pins to move along the contours of the notches to the next position. This obviates a disadvantage experienced in raising and lowering the head when the rear bar was straight and fastened to the rear end of the head. Furthermore, moving the pivot between the upper end of bar 30 and the platform of the head forward shifted the fulcrum supporting the weight of the head and considerably reduced the weight which had to be lifted when the head was adjusted to another height. The edges of the uprights defining the contours of the notches have been rounded to facilitate head adjustments, the smooth rounded contours offering less obstruction, resistance and friction to free sliding movement of the pivot pins.

The object to be sawed, as stated, is placed upon the carriage 40 and the carriage is advanced by rolling it forwardly along the edges of the horizontal supports. During the cutting operation lubricant is supplied to the sides of the cutter through jets 25a as described.

From the foregoing it will be seen that this invention is well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A masonry saw comprising a frame having front and rear uprights and a horizontal support therebetween, a workpiece carrier movable longitudinally of the horizontal support, a cutter head pivoted on and vertically adjustable upon the rear uprights, an adjustment bar assembly connecting the cutter head and frame adapted to hold the cutter head rigid in any selected cutting position with respect to the horizontal support and workpiece carrier, said adjustment bar assembly comprising a vertical bar located rearwardly of the rear uprights and hingedly connected at its upper end to the cutter head, a connecting device on the frame loosely encompassing the lower part of said bar whereby said bar moves longitudinally through said device to accommodate adjustment of the cutter head, and means for tightening said device on said bar thereby to hold the cutter head in a selected position.

2. A masonry saw comprising a frame having front and rear uprights and a horizontal support therebetween, a workpiece carrier movable longitudinally of the horizontal support, a cutter head pivoted on and vertically adjustable upon the rear uprights, an adjustment bar assembly connecting the cutter head and frame adapted to hold the cutter head rigid in any selected cutting position with respect to the horizontal support and workpiece carrier, said adjustment bar assembly comprising a horizontal rod supported in the frame beneath the horizontal support and a vertical bar located rearwardly of the rear uprights, opposed clamping dogs adapted to grip opposite sides of the vertical bar forming the adjustable connection between the horizontal rod and vertical bar.

3. A masonry saw comprising a frame having front and rear uprights and a horizontal support therebetween, a workpiece carrier movable longitudinally of the horizontal support, a cutter head pivoted on and vertically adjustable upon the rear uprights, an adjustment bar assembly connecting the cutter head and frame adapted to hold the cutter head rigid in any selected cutting position with respect to the horizontal support and workpiece carrier, said adjustment bar assembly comprising a horizontal rod supported in the frame beneath the horizontal support and a vertical bar located rearwardly of the rear uprights, opposed clamping dogs adapted to grip opposite sides of the vertical bar forming the adjustable connection between the horizontal rod and vertical bar, said dogs adjustable from the front of the frame by rotation of the horizontal rod.

4. A masonry saw comprising a frame having front and rear uprights and a horizontal support therebetween, a workpiece carrier movable longitudinally of the horizontal support, a cutter head pivoted on and vertically adjustable upon the rear uprights, an adjustment bar assembly connecting the cutter head and frame adapted to hold the cutter head rigid in any selected cutting position with respect to the horizontal support and workpiece carrier, said adjustment bar assembly comprising a horizontal rod supported in the frame beneath the horizontal support and a vertical bar located rearwardly of the rear uprights, said vertical bar bent centrally to have its upper end located rearwardly of its lower end, said bar having adjustable rigid connections with the cutter head and horizontal rod.

5. A masonry saw comprising a frame having front and rear uprights and a horizontal support therebetween, a workpiece carrier movable longitudinally of the horizontal support, a cutter head pivoted on and vertically adjustable upon the rear uprights, an adjustment bar assembly connecting the cutter head and frame adapted to hold the cutter head rigid in any selected cutting position with respect to the horizontal support and workpiece carrier, said adjustment bar assembly comprising a horizontal rod supported in the frame beneath the support and a vertical bar located rearwardly of the rear uprights, said vertical bar having an adjustable rigid connection with the horizontal rod and pivoted to the cutter head forward of its rear end whereby the fulcrum for the weight of the head in adjusting the head for height is advantageously shifted.

6. A masonry saw comprising a frame having front and rear uprights and a horizontal support therebetween, a workpiece carrier movable longitudinally of the horizontal support, a cutter head pivoted on and vertically adjustable upon the rear uprights, an adjustment bar assembly connecting the cutter head and frame adapted to hold the cutter head rigid in any selected cutting position with respect to the horizontal support and workpiece carrier, said adjustment bar assembly comprising a horizontal rod supported in the frame beneath the horizontal support and a vertical bar located rearwardly of the rear uprights, said vertical bar bent centrally to have its upper end located rearwardly of its lower end and an adjustable rigid connection between the bar and the horizontal rod, the upper end of the vertical bar pivoted to the head forward of its rear end whereby the fulcrum for the weight of the head in adjusting the head for height is advantageously shifted.

7. A masonry saw comprising a frame having front and rear uprights and a horizontal support therebetween, a workpiece carrier movable longitudinally of the horizontal support, notches in the rear uprights, a cutter head having pins extending laterally to engage said notches whereby said cutter head is pivoted on and vertically adjustable upon said rear uprights, an adjustment bar assembly connecting the head and frame adapted to hold the cutter head rigid in any selected cutting position with respect to the horizontal support and workpiece carrier, said adjustment bar assembly including a horizontal rod beneath the horizontal support adjustably connected to a vertical bar located rearwardly of the vertical uprights, and a pin insertable in vertically spaced holes in the bar adapted to support the cutter head during vertical adjustment of the head.

8. A masonry saw comprising a base having at its rear a pair of spaced-apart posts, each being provided with a notch in the edge thereof, a cutter head having pins extending laterally to engage said notches, an upright bar having one end connected to said cutter head, a fulcrum engaging one side of the bar, and means for applying a substantially horizontal force to the bar at a point so related to the fulcrum that said one end of the bar urges the cutter head pins toward the base of their associated notches.

9. A masonry saw comprising a base having at its rear a pair of spaced apart posts, each being provided with a series of notches in the edge thereof, a cutter head having trunnions extending laterally and adapted to engage any horizontally aligned pair of notches on the opposite posts, said head adapted to rock about said trunnions, a lever having one end hingedly connected to said cutter head at a point spaced substantially horizontal from the axis of said trunnions, a fulcrum engaging one side of said lever, and means for applying a force to the lever at a point so related to said fulcrum that the force transmitted by the lever to said cutter head through said hinged connection urges the trunnions deeper into said notches.

10. A masonry saw comprising a base having at its rear a pair of spaced-apart posts, each being provided with a notch in the forward edge thereof, a cutter head having pins extending laterally to engage said notches, an upright bar disposed rearwardly of said posts and having one end connected to said cutter head, mechanism adapted to apply a forwardly directed force to said bar at a point removed from said one end, said bar having a fulcrum on the forward side thereof intermediate said point and said one end, whereby the application of said force to the bar urges the cutter head pins rearwardly into said notches.

11. A masonry saw comprising a base having at its rear a pair of spaced-apart posts, each being provided with a series of notches in the forward edge thereof, a cutter head having trunnions extending laterally and adapted to engage any horizontally aligned pair of notches on the opposite posts, said head adapted to rock about said trunnions, an upright bar disposed rearwardly of said posts and hingedly connected at its upper end to said cutter head, a fulcrum fixedly positioned on the base so it engages the forward side of the bar, a dog loosely engaging the rear side of the bar below said fulcrum, whereby said bar is adapted to slide up and down between the fulcrum and dog as said head is rocked, and mechanism on the base for forceably drawing said dog horizontally forward thereby to clamp said rod and cause same to transmit a force to the cutter head urging the trunnions toward the base of their associated notches.

12. In a machine of the character described, a frame comprising a horizontal bed with uprights at the rear thereof, a cutter head pivoted on the uprights, said head extending over said bed and carrying a tool spaced above the bed, a bar hingedly connected to the cutter head at a point spaced from the pivotal axis thereof, a device on the frame loosely embracing the shank of the bar whereby said bar moves longitudinally through said device as the cutter head turns about said pivotal axis, and means for tightening said device on said bar thereby to hold the cutter head in a selected position.

13. In a machine of the character described, a frame comprising a horizontal bed with uprights at the rear thereof, a cutter head pivoted on the uprights, said head extending over said bed and carrying a tool spaced above the bed, a bar hingedly connected to the cutter head at a point spaced from the pivotal axis thereof, a fitting on the frame providing a passageway through which the shank of said bar is adapted to move longitudinally as said cutter head turns about said pivotal axis, said fitting including a dog adjacent the shank of the bar, and mechanism operated at will to urge the dog forcibly against said shank to restrain same against movement through said passageway.

14. In a machine of the character described, a frame comprising a horizontal bed with uprights at the rear thereof, a cutter head pivoted on the uprights, said head extending over said bed and carrying a tool spaced above the bed, a bar highedly connected to the cutter head at a point spaced from the pivotal axis thereof, a fitting on the frame providing a passageway through which the shank of said bar is adapted to move longitudinally as said cutter head turns about said pivotal axis and means operable when the cutter head has been turned about its pivotal axis to any desired position to immobilize the shank of the bar relative said fitting thereby to stabilize the cutter head in such position.

NELIGH CLAIR COATES.

REFERENCES CITED

The following references are of record in the file of this patent:

UNITED STATES PATENTS

| Number | Name | Date |
|---|---|---|
| 2,247,183 | Bour | June 24, 1941 |
| 2,377,437 | Martin | June 5, 1945 |
| 2,378,070 | Eastwood | June 12, 1945 |